United States Patent [19]
Lacey

[11] 3,758,063
[45] Sept. 11, 1973

[54] ADJUSTABLE SEATS FOR TRUCKS, COACHES AND OTHER VEHICLES

[75] Inventor: Robert Ronald Lacey, Bromham, England

[73] Assignee: Universal Oil Products Company, Des Plaines, Ill.

[22] Filed: Mar. 1, 1972

[21] Appl. No.: 230,905

[30] Foreign Application Priority Data

Mar. 3, 1971    Great Britain...................5941/71

[52] U.S. Cl.............. 248/161, 248/402, 248/411, 287/58 CT, 24/279
[51] Int. Cl............................................ A47b 95/00
[58] Field of Search................... 248/402, 403, 162, 248/401, 399, 411, 412, 161; 287/58 CT; 85/33; 285/407, 409, 410; 24/279, 284, 285, 125 K, 132 LS, 135 K

[56] References Cited
UNITED STATES PATENTS

| 669,389 | 3/1901 | Gundry............................ 287/58 CT |
| 1,385,129 | 7/1921 | Heise.............................. 287/58 CT |
| 2,705,122 | 3/1955 | Whitehead....................... 287/58 CT |
| 2,977,995 | 4/1961 | Walpole............................... 24/279 |
| 3,319,920 | 5/1967 | Freedman et al................... 248/399 |
| 2,991,495 | 7/1961 | Blalack.............................. 248/161 |
| 3,600,770 | 8/1971 | Halling............................... 24/279 |

FOREIGN PATENTS OR APPLICATIONS

| 1,143,138 | 4/1957 | France.............................. 248/411 |
| 479,629 | 4/1953 | Italy............................... 287/58 CT |

*Primary Examiner*—Marion Parsons, Jr.
*Attorney*—James R. Hoatson, Jr. et al.

[57] ABSTRACT

Pedestal type seat mount comprises a pair of telescopic tubular members, one of which is attached to the vehicle floor and the other of which is attached to the seat and adapted to move vertically relative to the floor. The outer telescopic member carries a toggle operated clamping device which is operative to clamp the telescopic members together in selected positions of vertical adjustment. In one embodiment, the tubular members include guide members preventing rotation, while in another embodiment, the tubular members can rotate relative to each other for adjusting the direction of the seat forces and can also be clamped in any position of adjustment by a pair of rotaty cam members.

7 Claims, 5 Drawing Figures

PATENTED SEP 11 1973　　3,758,063

ADJUSTABLE SEATS FOR TRUCKS, COACHES AND OTHER VEHICLES

The present invention relates to vehicle seats, and more particularly to seats for use in trucks or buses.

According to the present invention, there is provided a vehicle seat including a seat support assembly comprising inner and outer telescopic members extending upwardly, one of the members being fixed and the other member being movable and carrying seat-supporting means at its upper end portion, resilient means biasing the movable member upwardly relative to the fixed member, and a toggle-operated clamping device carried by the outer member and operative to clamp the outer member to the inner member so as to secure the movable member at a selected height relative to the fixed member.

Further according to the present invention, there is provided a vehicle seat comprising inner and outer telescopically movable tubes, one of which is a fixed tube extending upwardly from a floor-mounted support member and the other of which is a movable tube slidable vertically relative to the fixed tube and carrying a seat at its upper end, and a toggle-operated clamp mounted on the outer tube and movable manually into and out of a clamping position in which it locks the outer tube to the inner tube, the clamp comprising a pair of brackets spaced apart around the outer tube, a first clamping member pivotally engaging one bracket, a second clamping member pivotally engaging the other bracket, the two clamping members being pivoted together on a pivot axis remote from their points of engagement with the brackets and said members being movable, by movement of said pivot axis, from a relaxed position through an in-line position to a stable locking position, and a screw member movable to vary the effective length of one of said clamping members.

Embodiments of the invention will now be described, by way of example only, with reference to the accompanying diagrammatic drawings, in which.

Figure 1:
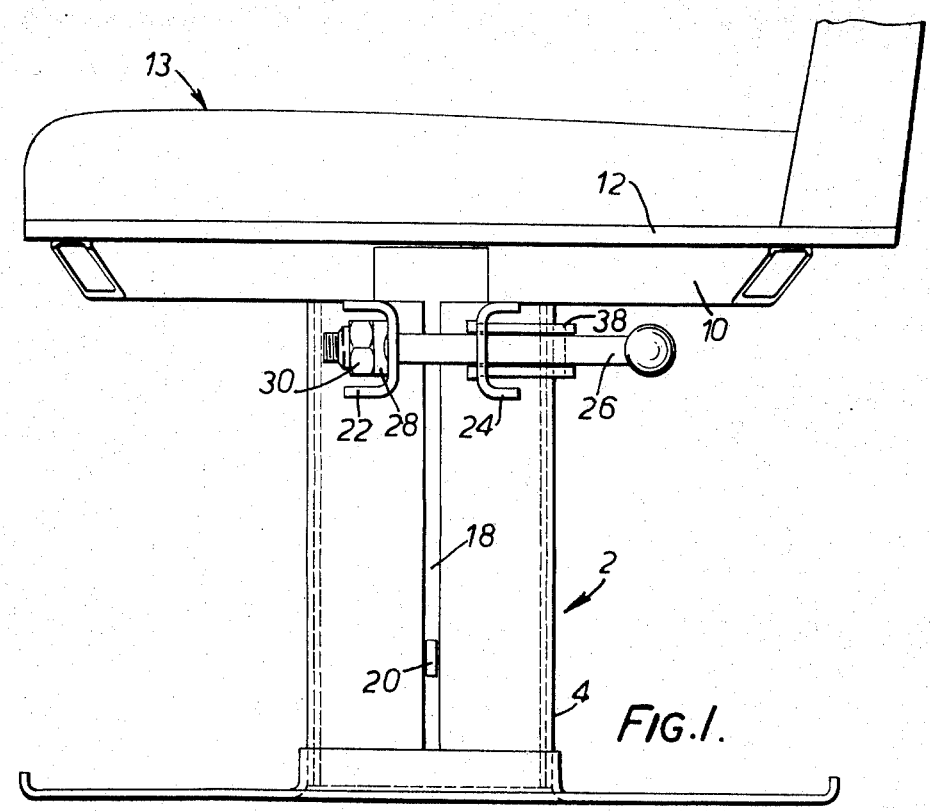
FIG. 1 is a side elevation of an embodiment of a pedestal support assembly in a vehicle seat in accordance with the invention.
Figure 2:
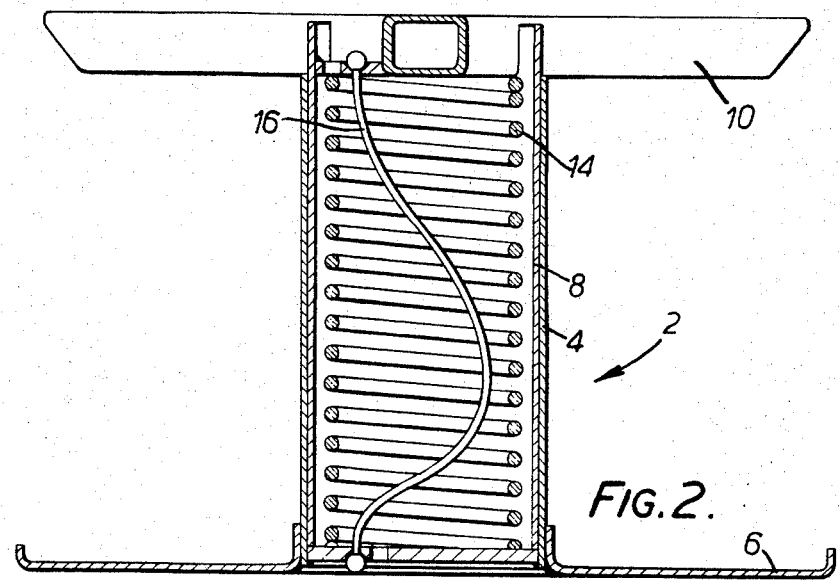
FIG. 2 is a longitudinal section of the support assembly.
Figure 3:
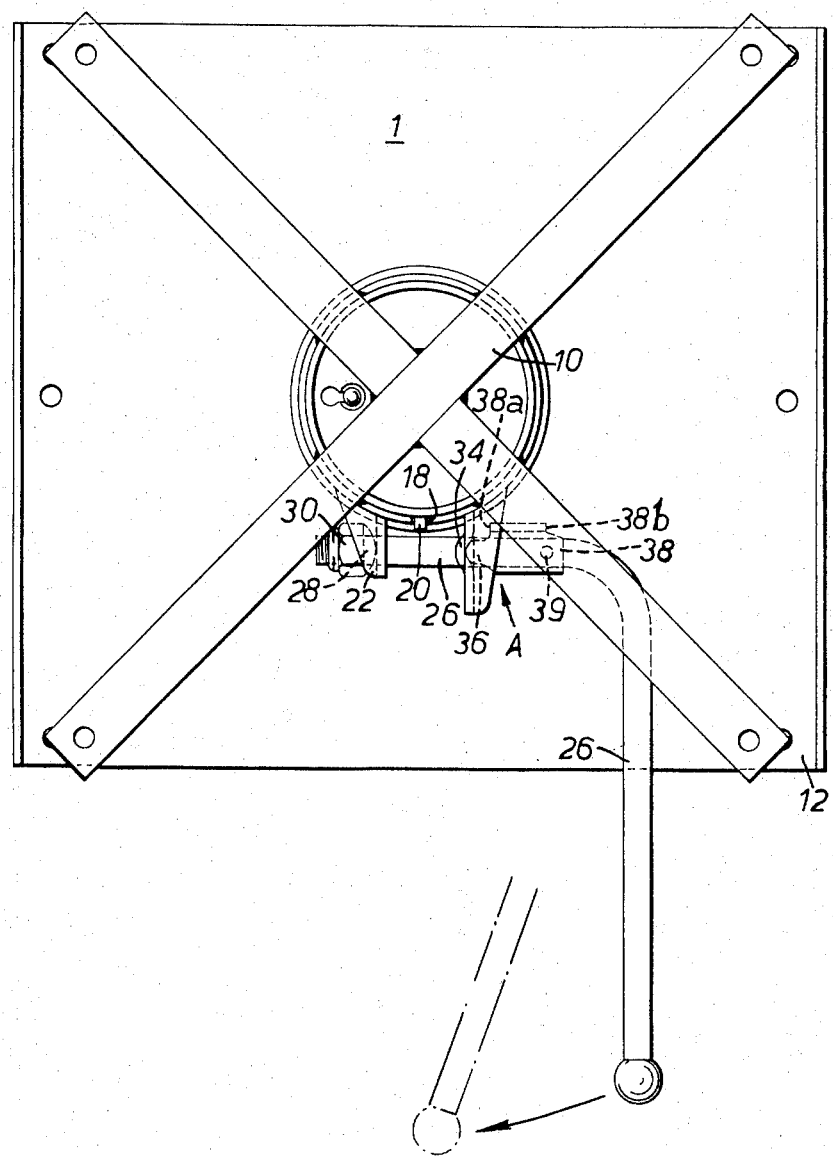
FIG. 3 is a plan view of the support assembly.
Figure 4:
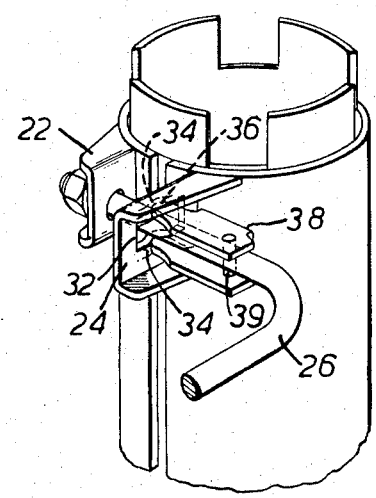
FIG. 4 is a perspective view of a clamping device of the support assembly in the direction of arrow A in FIG. 3.

As shown in FIGS. 1 to 4 of the drawings, a vehicle seat comprises a pedestal support assembly 2 including an outer vertically extending tube 4 welded to a base plate 6, and an inner vertically extending tube 8 slidable telescopically in the outer tube 4. An X-shaped tubular supporting frame 10 is mounted at the upper end of the inner tube 8 and carries the base 12 of a seat assembly 13. A compression spring 14 disposed within the inner tube 8 extends between the base plate 6 and the supporting frame 10 and acts to bias the inner tube 8 upwardly relative to the outer tube 4. The force exerted by the compression spring 14 is just sufficient, when the seat assembly 13 is unoccupied, to raise the inner tube 8, and hence the supporting frame 10 and seat assembly 13, relative to the outer tube 4. Upward movement of the inner tube 8 is limited by a restraint wire 16 extending between the upper end of the inner tube 8 and the lower end of the outer tube 4.

The outer tube 4 is provided with a longitudinally extending slot 18 into which projects a lug 20 welded to the outer surface of the inner tube 8. The lug 20 slides along the slot 18 when the inner tube 8 is raised or lowered relative to the outer tube 4 and acts to prevent relative rotation between the two tubes.

To secure the inner tube 8, and hence the supporting frame 10 and seat assembly, at a selected height relative to the outer tube 4, a clamping device is provided which is operable to pinch the sides of the slot 18 towards each other in a sense to reduce the diameter of the outer tube 4 so that the inner tube 8 is gripped by the outer tube 4. It will be seen that the slotted upper end of the outer tube forms a chuck, and that other forms of chuck, for example detachably secured to the upper end of the outer tube could be used.

The clamping device comprises first and second brackets 22, 24 attached to the outer tube 4 on opposite sides of the slot 18. A rod 26 extends between the brackets 22, 24, one end portion of the rod 26 being threaded and extending through an enlarged bore in the bracket 22. A rocker member 28 mounted on the threaded end portion is interposed between an anchoring nut 30 and the outer face of the bracket 22 so that the rod 26 can rock or pivot relative to the bracket 22. The rod 26 also extends through a slot 32 in the bracket 24.

A toggle member 38 is pivotally mounted on the rod 26 by a pin 39, the toggle member 38 lying on the side of the bracket 24 remote from the bracket 22. The toggle member 38 is of channel-section, the respective side walls thereof lying above and below the rod 26, and the base wall thereof lying between the rod 26 and the outer tube 4. At the end portion of the toggle member 38 adjacent the bracket 24 and remote from the pin 39, the side walls are cut away to form arcuate nose portions 36 and the base wall is cut away to form an edge 38a. The nose portions 36 engage in respective concave seats 34 formed on the outer face of the bracket 24 on opposite sides of the slot 32. At the other end portion of the toggle member 38, the pin 39 extends between the side walls and the base well is cut away adjacent the pin 39 to form an edge 38b. The outer end of the rod 26 beyond the toggle member 38 is cranked to form an integral handle.

In an unlocked condition of the clamping device, the rod 26 is located adjacent the outer end of the slot 32 (as shown in phantom lines in FIG. 3), the toggle member 38 being inclined to the rod 26 and being located in a relaxed position in which the rod 26 abuts against the outer end edge of the slot 32. To operate the clamping device, the rod 26 is pivoted about the rocker member 28 from the first relaxed position, through the in-line position shown in solid lines in FIG. 3 in which the forces acting at the three pivots of the clamping device are in alignment with one other and into an over-centre locked position located slightly beyond the inline position; in the locked position the rod 26 abuts against the inner end edge of the slot 32. During this movement from the relaxed position, the rod 26 moves along the slot 32 toward the inner end thereof whilst the toggle member 38 moves, by pivotal movement of its nose portions 36 in the seats 34, into alignment with the rod 26 when the rod 26 is located in the in-line position. This action causes the two brackets 22, 24 to be drawn together and hence the outer tube 4 to be clamped down on to the inner tube 8. Movement of the rod 26 slightly beyond the in-line position causes the toggle member 38 to move into the locked position in which the rod 26 abuts against the inner end edge of the slot 32; the rod 26 and the toggle memer 38 are thus secured in a stable equilibrium position in which the clamping device is held tight.

When the inner tube 8 is clamped within the outer tube 4, vibrational movement between the tubes is prevented and consequently the support assembly will not rattle when the vehicle is travelling over rough terrain or is otherwise subject to vibrations. To compensate for wear between the tubes which may occur over long periods of use, the nut 30 can be screwed along the end portion of the rod 26 to draw the brackets 22, 24 closer together and thus to decrease the effective internal diameter of the outer tube 4.

The support assembly described can be additionally strengthened by reinforcing members (not shown) extending between the upper end of the outer tube 4 and the outer portions of the base plate 6. Suitably, the reinforcing members are of channel section and are diametrically opposed on either side of the clamping device.

Figure 5:
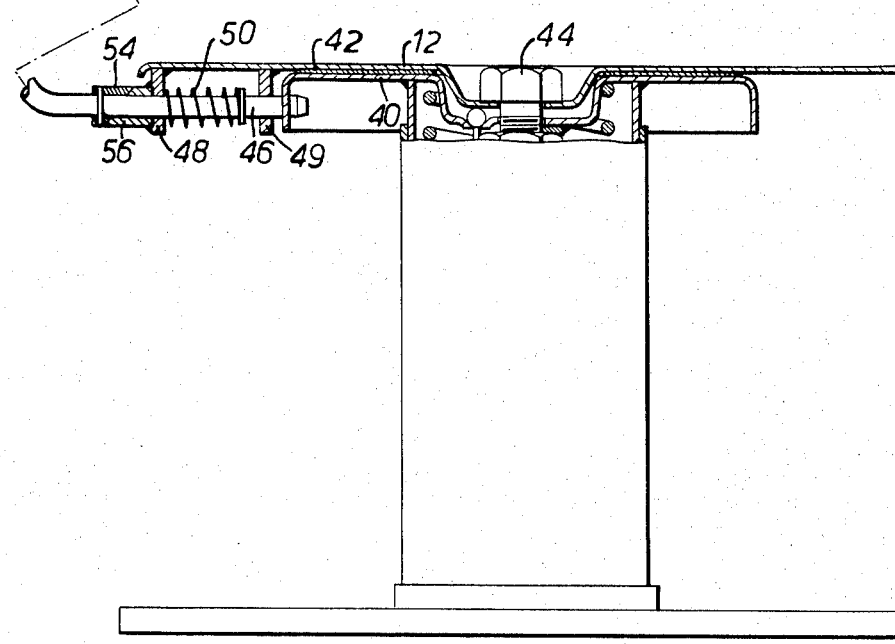
FIG. 5 is a side elevation partially in section, of another embodiment of a support assembly.

The support assembly shown in FIG. 5 differs from that of the previous embodiment in that the base 12 can pivot about a vertical axis relative to the inner tube 8. As shown in FIG. 5, a fixed plate 40 is mounted at the upper end of the inner tube 8 and carries the base 12 via an annular bearing member 42. The base 12 is rotatable about a pivot assembly in the form of a bolt 44 extending downwardly through the base 12 and the fixed plate 40 and anchored by a nut carried by the underside of the fixed plate 40. The pivot assembly is coaxial with the inner tube 8.

The base 12 can be locked against rotation by a pin 46 journalled in lugs 48, 49 depending from the base 12, the pin being biased by a compression spring 50 into engagement with an aperture (or a selected one of a plurality of apertures) in the fixed plate 40. The pin 46, which is integral with a cranked handle 52, carries a cam 54 co-operable with a cam 56 fixedly mounted on the lug 48 and is withdrawn from engagement with the aperture in the fixed plate 40 by rotating the handle 52. This form of seat is of particular use for the drivers seat in a bus or coach of the type in which the driver also collects the fares. The seat can be locked in a driving position when the pin 46 is engaged in the aperture in the fixed plate 40, and can pivot into a position to enable the driver to collect the fares when the pin 46 is withdrawn from the aperture.

I claim as my invention:

1. A vehicle seat including a seat support assembly comprising inner and outer telescopic members extending upwardly, said outer member including a slot extending the entire length thereof, one of the members being fixed and the other member being movable and carrying seatsupporting means at its upper end portion, resilient means biasing the movable member upwardly relative to the fixed member, and a toggle-operated clamping device carried by the outer member and operative to clamp the outer member to the inner member so as to secure the movable member at a selected height relative to the fixed member, said clamping device comprising brackets mounted on the outer member on opposite sides of the slot, a clamping member extending between the brackets, the clamping member being pivotally anchored to one of the brackets and passing through a slot in the other bracket, and a toggle member pivotally mounted on the clamping member and pivotally engaged with the said other bracket, an operating means for moving the clamping member along the slot in the said other bracket to move the toggle member from a relatively relaxed position in which the brackets are spaced relatively apart, through an in-line position in which the toggle member forces the brackets relatively closer together and tightens the clamping device into a stable equilibrium position in which the clamping device is locked in the tightened condition.

2. A seat according to claim 1 in which the toggle member is positioned on the side of the said other bracket remote from the said one bracket, and is of channel section having side walls located on opposite sides of the clamping member, at one end portion of the toggle member, the side walls pivotally engaging the outer face of the said other bracket on opposite sides of the slot, and at the other end portion of the toggle member, the toggle member being pivotally connected to the clamping member about an axis extending between the side walls, the clamping member abutting the rear wall of the toggle member when the toggle member is positioned in its relaxed and locked positions.

3. A seat according to claim 1 wherein the clamping member is pivotally anchored to the said one bracket by means of a rocker member mounted on the clamping member and engaging a face of the said one bracket remote from the other bracket, the rocker member being selectively movable along the clamping member so as to adjust the spacing between the brackets.

4. A seat according to claim 1 wherein the seat-supporting means is mounted on the inner member, the clamping device is mounted at the upper end portion of the outer member, and the inner member carries a lug projecting through the slot in the outer member whereby to prevent relative rotation between the inner and outer members.

5. A seat according to claim 1 in which the seat-supporting means is mounted for rotational movement relative to the movable member about a vertical axis, said assembly further comprising means selectively operable to lock the seat supporting means against rotation relative to the movable member.

6. A seat according to claim 5 wherein said means selectively operable to lock the seat supporting means against rotation comprises a rotary cam member adapted to be rotated by a rotary control handle, said rotary cam member cooperating with a fixed cam on the seat supporting member to cause a locking member carried by said supporting member to move into and out of engagement with said movable member as said handle is rotated.

7. A vehicle seat comprising inner and outer telescopically movable tubes, one of which is a fixed tube extending upwardly from a floor-mounted support member and the other of which is a movable tube slidable vertically relative to the fixed tube and carrying a seat member at its upper end, and a toggle-operated clamp mounted on the outer tube and movable manually into and out of a clamping position in which it locks the outer tube to the inner tube, the clamp comprising a pair of brackets spaced apart around the outer tube, an elongated clamping member including a first clamping portion pivotally engaging one bracket, a second clamping member having a second clamping portion pivotally engaging the other bracket, said second clamping member being pivotally mounted to said first clamping member about a pivot axis remote from the points of engagement of said clamping portions with their respective brackets and operating means on said elongated member for moving said pivot axis from a relaxed position through an in-line position to a stable locking position, and adjustment means to vary the effective length of one of said clamping members.

* * * * *